Sept. 14, 1937.   A. BERNHARD ET AL   2,092,826
PHOTOELECTRIC EXPOSURE METER
Filed March 14, 1935    2 Sheets-Sheet 1
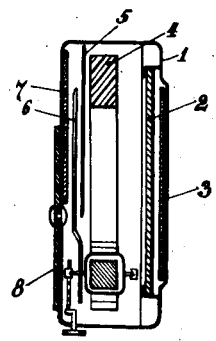
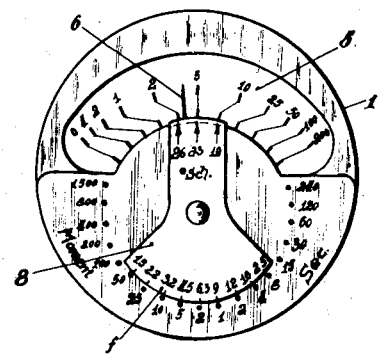
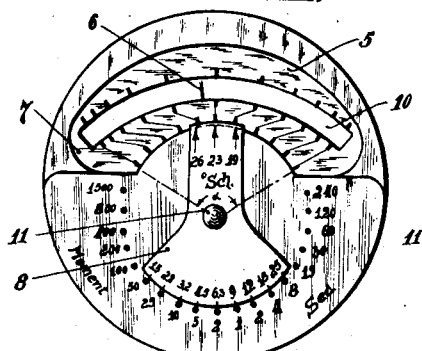
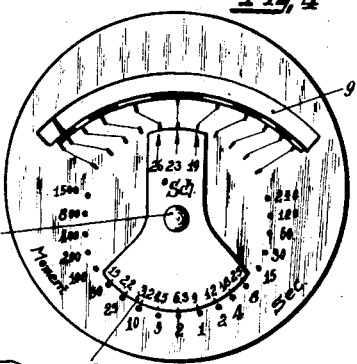
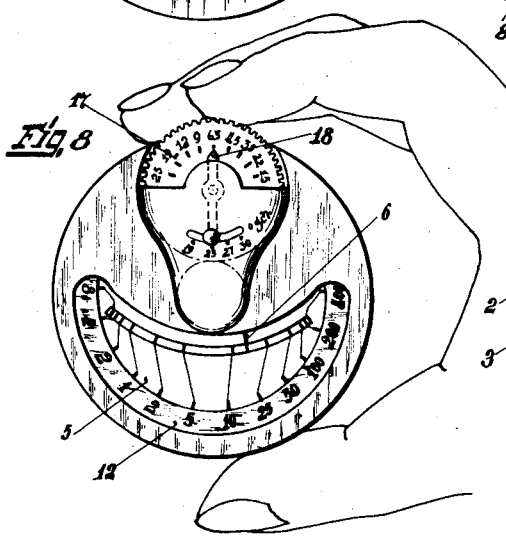
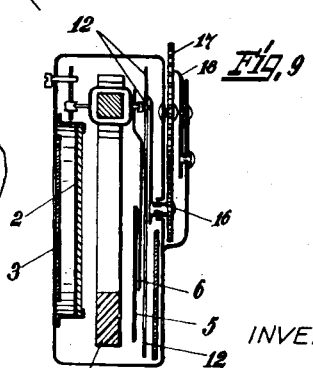
INVENTORS.
Albrecht Bernhard
Guido Bayrich
Hans Habermann
By Stone, Boyden & Mack
ATTORNEYS

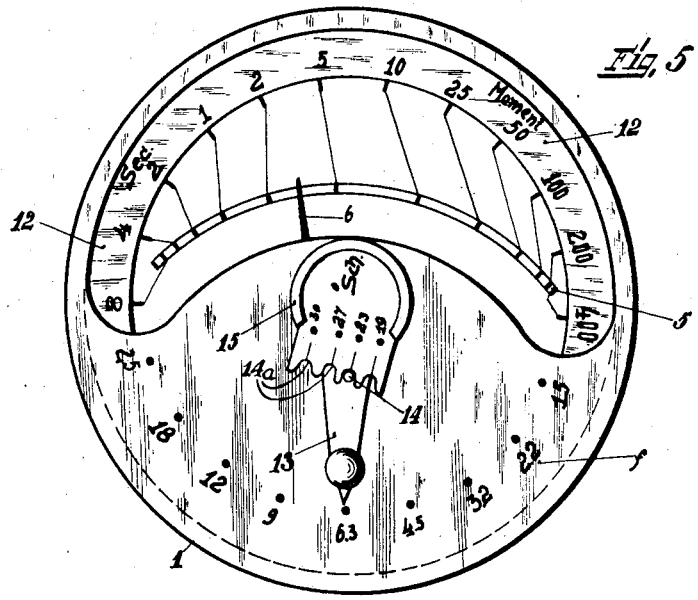
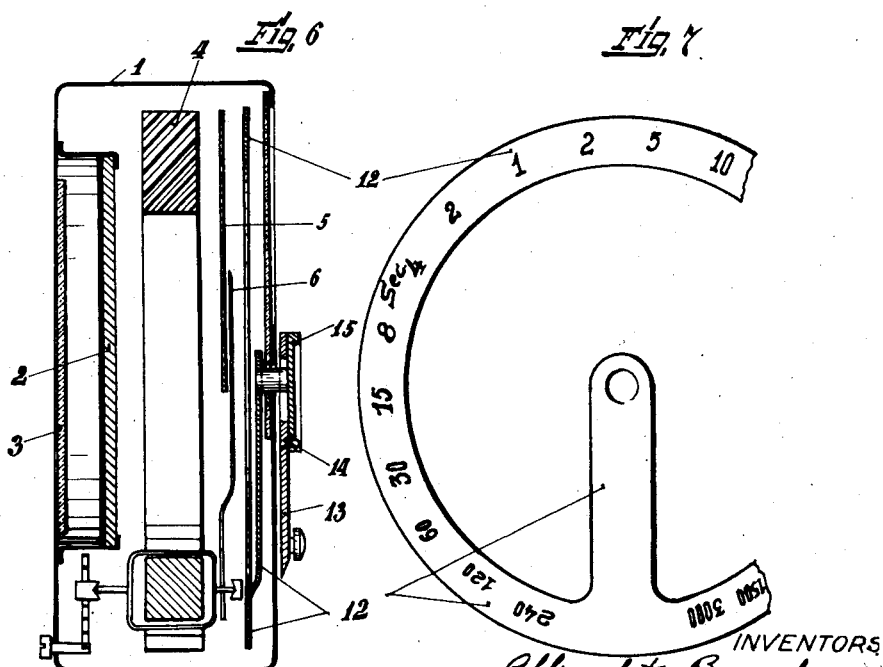

Patented Sept. 14, 1937

2,092,826

UNITED STATES PATENT OFFICE 2,092,826

PHOTOELECTRIC EXPOSURE METER

Albrecht Bernhard, Guido Beyrich, and Hans Habermann, Nuremberg, Germany, assignors to Metrawatt Aktiengesellschaft, Fabrik Elektrischer Messgeraete, Nuremberg, Germany, a company of Germany Application March 14, 1935, Serial No. 11,140
In Germany March 23, 1934

4 Claims. (Cl. 88—23)

The present invention relates to a photo-electric exposure meter of the type comprising a photo-electric element and a direct current measuring instrument. Apparatus of this kind usually comprise an adjustable iris diaphragm arranged in front of the photo-electric element which enables the stop adjustment and plate sensitivity to be used for the particular exposure to be taken into account in the measurement.

It is an object of the present invention to provide an exposure meter wherein an adjustable iris diaphragm is dispensed with.

A further object of the invention is to provide a photo-electric exposure meter comprising a plurality of scales inter-related in such a manner that exposure times may be derived from the photo-electric indication, for different stops and plate sensitivities.

A still further object of the invention is to provide an exposure meter in which a photo-electric indication may be interpolated for a selected plate sensitivity and stop value to establish the corresponding exposure time.

Still another object of the invention is to provide a photo-electric exposure meter wherein manually operable means are provided which can be set in accordance with a given plate sensitivity and/or stop value to interpolate a photo-electric indication into a corresponding exposure time for the given plate sensitivity and stop value.

Further objects of the invention will be apparent from the description as it proceeds.

In order that the invention may be more clearly understood some embodiments thereof are described hereinafter with reference to the accompanying drawings in which:

Fig. 1 is a cross-sectional view of one form of exposure meter according to the invention;

Fig. 2 is a front view of the meter shown in Fig. 1;

Fig. 3 is a front view of a further embodiment of the invention;

Fig. 4 is a modification of the device shown in Fig. 3;

Fig. 5 is a front view of a further form of the invention employing a rotating scale of exposure times;

Fig. 6 is a cross-sectional view of the embodiment shown in Fig. 5;

Fig. 7 is a detail of the apparatus shown in Figs. 5 and 6;

Fig. 8 is a front view and

Fig. 9 a cross-sectional view of still another form of the invention employing a modified scale operating mechanism.

In Figs. 1 and 2 an exposure meter is shown comprising a casing 1, a photo-electric element 2, and a protective disc 3. The current measuring instrument comprises the magnet 4, the scale 5 and the pointer 6, which is visible through an aperture 7 in the casing. The measuring scale 5 is divided into non-uniform (logarithmic) divisions representing exposure times, corresponding to a given stop and a given plate sensitivity, the scale divisions being somewhat more widely spaced at the centre owing to the non-uniform distribution of the field between the poles of the permanent magnet. In order to facilitate the interpolation of the exposure times read off, for different stops and/or plate sensitivities, a slide 8 is rotatably mounted on the casing of the exposure meter. The slide 8 carries at one end a scale calibrated in the usual stop values $f$, which moves over a scale divided in the usual exposure times. At the other end, the slide carries a scale divided in plate sensitivities (26°, 23°, 19° Sch) which moves over a uniform scale provided on the scale 5 and the divisions of which are linked up with the measuring scale by means of oblique connecting strokes. As can readily be seen, it is possible to bring the scale of stops $f$ into the correct position relative to the lower scale of exposure times, by rotating the slide 8 for each exposure time value read off, into the appropriate position for the individual reading, in accordance with the appropriate one of the given plate sensitivities (or some intermediate value), so that for each stop the corresponding exposure time can be read off.

The uniform auxiliary scale, and possibly the measuring scale also may be arranged outside, on the front cover of the casing, the pointer, as illustrated in Fig. 4, being visible through an opening 9 in the casing cover. Preferably, however, the measuring scale and the auxiliary scale are arranged on an inner scale dial 5, which is arranged in front of the pointer and has an opening 10 through which the pointer can be viewed, as shown in Fig. 3. The measuring scale is preferably calibrated for the stop $f/6.3$ and 26° Sch so that for these values the question of interpolation of the results does not arise. However, as is illustrated in Fig. 4, the measuring scale may also be left unmarked, so that the slide 8 must be adjusted after each measurement. The angle $\alpha$ subtended by the auxiliary scale is made as large as possible, preferably as much as possible greater than 90°, so that the connecting lines for the auxiliary scale are short and straight and so that a great arc length is obtained for the lower time scale and also for the movement of the rotary slide 8.

The arrangement may be so devised that the centre 11 of the rotary slide 8 coincides with the centre of the casing and of the measuring system. However, it will sometimes be preferable to arrange the three centres in such a manner that the centre of the rotary slide lies between the centres of the casing and the moving coil system.

In order to make the connecting lines between the logarithmic measuring scale and the uniform auxiliary scale clearly distinguishable, they may advantageously be executed in alternately different colours or distinguished in some other way.

The constructions shown in Figs. 5 to 9 differ from those hitherto described in that, in addition to the uniform auxiliary scale, a rotatable scale is provided, from which the exposure times may be read off, and which may be adjusted to different positions relative to the uniform auxiliary scale. Said adjustment is effected in accordance with the stop adjustment of the camera or plate sensitivity to be employed and may conveniently be effected from outside. In the construction according to Figs. 5 and 6, the rotatable scale 12, (shown separately in Fig. 7) is connected to a rotatable pointer 13 which moves over a scale of stops $f$ provided on the outside of the casing. The pointer 13 is adjusted to the stop $f$ to be used, so that the scale connected thereto is so adjusted relatively to the uniform auxiliary scale that, for a given deflection of the pointer, the corresponding value (for instance, 1/5 second) can be read off without difficulty by tracing the connecting line from the measuring scale to the uniform auxiliary scale. In order to allow for the plate sensitivity, the pointer 13 which is mounted on the axis of rotation of the scale 12 may be fixed by means of an adjustable hub in different positions, each corresponding to a different plate sensitivity. For example, to this end, the adjusting pointer 13 may be radially movable, so that the pin 14 fixed thereon may be brought to lie in any one of the notches 14a in the hub 15. The individual notches are each provided with a particular designation of degrees Sch.

The construction illustrated in Figs. 8 and 9 varies in construction somewhat from the embodiments above described. In this case, the scale 12 is connected to the axis of a toothed wheel 16 which, in turn, engages with a toothed wheel or toothed segment 17 which carries the scale of stops $f$. Adjustment of the toothed wheel 17 is effected in relation to a pointer 18, the position of which can be set in accordance with the Sch value.

Of course, modifications of the constructional examples described may be made without departing from the scope of the invention. For instance, in exposure meters which are used in kinematography, the various speeds of exposure may be marked on the scale 12. If the speed of exposure is taken as given, then the corresponding stop adjustment can readily be determined by rotating the scale.

We claim:—

1. Exposure meter comprising a casing, a photoelectric element and a direct current measuring instrument in said casing, an arcuate non-uniform scale, a pointer operated by said measuring instrument and operating on said non-uniform scale, an arcuate uniform scale connected division-by-division with said non-uniform scale, said non-uniform and said uniform scales lying on a flat surface, an annular flat scale rotatably mounted in the wall of said casing, said annular scale being adjacent to said uniform scale, means, outside said casing, for rotating said annular scale, and means on said rotating means for indicating the setting of said annular scale in accordance with a given plate sensitivity and a given stop value.

2. Exposure meter comprising a casing, a photoelectric element and a direct current measuring instrument in said casing, an arcuate non-uniform scale, a pointer operated by said measuring instrument and operating on said non-uniform scale, an arcuate uniform scale connected division-by-division with said non-uniform scale, said non-uniform and said uniform scales lying on a flat surface, an annular flat scale rotatably mounted in the wall of said casing, said annular scale being adjacent to said uniform scale, an aperture in said casing for viewing said non-uniform and said uniform scales, the adjacent part of said annular scale, and said pointer, means outside said casing for rotating said annular scale, and means on said rotating means for indicating the setting of said annular scale in accordance with a given plate sensitivity and a given stop value.

3. Exposure meter comprising a casing, a photoelectric element and a direct current measuring instrument in said casing, an arcuate non-uniform scale, a pointer operated by said measuring instrument and operating on said non-uniform scale, an arcuate uniform scale connected division-by-division with said non-uniform scale, said non-uniform and said uniform scales lying on a flat surface, an annular flat scale rotatably mounted in the wall of said casing, said annular scale being adjacent to said uniform scale, a fixed scale of stop values, means outside said casing for rotating said annular scale, means on said rotating means for indicating the setting of said annular scale in accordance with a given plate sensitivity and a given stop value and comprising an indicator operating on said fixed scale of stop values and being connected outside said casing to said rotating means, and an adjustable connection between said indicator and said annular scale adapted to be set in accordance with a given plate sensitivity.

4. Exposure meter comprising a casing, a photoelectric element and a direct current measuring instrument in said casing, an arcuate non-uniform scale, a pointer operated by said measuring instrument and operating on said non-uniform scale, an arcuate uniform scale connected division-by-division with said non-uniform scale, said non-uniform and said uniform scales lying on a flat surface, an annular flat scale rotatably mounted in the wall of said casing, said annular scale being adjacent to said uniform scale, means outside said casing for rotating said annular scale, means on said rotating means for indicating the setting of said annular scale in accordance with a given plate sensitivity and a given stop value, a first gear wheel mounted on the axis of said rotatable scale and connected with said indicating means, a second gear wheel engaging said first gear wheel and extending outside said casing to be operated by hand, a scale of stop values on said second gear wheel, an indicator adjoining said scale of stop values, and means for setting said indicating means in accordance with a given plate sensitivity.

ALBRECHT BERNHARD.
GUIDO BEYRICH.
HANS HABERMANN.